(12) United States Patent
Chawla et al.

(10) Patent No.: US 11,411,758 B2
(45) Date of Patent: Aug. 9, 2022

(54) GENERATING CONTEXTUAL COMPLIANCE POLICIES

(71) Applicant: VMWARE, INC., Palo Alto, CA (US)

(72) Inventors: Ravish Chawla, Chamblee, GA (US); Adam Samuel Chow, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/068,549

(22) Filed: Oct. 12, 2020

(65) Prior Publication Data
US 2022/0116240 A1 Apr. 14, 2022

(51) Int. Cl.
| | |
|---|---|
| *H04L 12/18* | (2006.01) |
| *H04L 9/40* | (2022.01) |
| *G06Q 10/10* | (2012.01) |
| *H04L 51/224* | (2022.01) |

(52) U.S. Cl.
CPC ...... *H04L 12/1831* (2013.01); *H04L 12/1813* (2013.01); *H04L 12/1818* (2013.01); *H04L 51/24* (2013.01); *H04L 63/0807* (2013.01); *H04L 63/0815* (2013.01); *H04L 63/20* (2013.01); *G06Q 10/1093* (2013.01); *H04L 63/10* (2013.01)

(58) Field of Classification Search
CPC .. G06F 21/00–88; G06Q 10/109–1097; H04L 12/1813–1831; H04L 51/24; H04L 63/02–029; H04L 63/08–108; H04L 63/14–1491; H04L 63/20–205; H04L 67/30–34

See application file for complete search history.

(56) References Cited

U.S. PATENT DOCUMENTS

| | | | | |
|---|---|---|---|---|
| 7,679,518 B1* | 3/2010 | Pabla | ............... | G06Q 10/109 340/573.1 |
| 8,239,915 B1* | 8/2012 | Satish | ............... | H04L 63/20 726/1 |
| 8,576,750 B1* | 11/2013 | Hecht | ............... | H04M 3/56 370/261 |
| 8,832,205 B2* | 9/2014 | Nelson | ............... | G06Q 10/109 709/206 |
| 9,021,569 B1* | 4/2015 | Kashyap V | ............ | G06F 21/35 726/7 |
| 9,615,221 B1* | 4/2017 | Onyon | ............... | H04L 51/12 |
| 10,616,278 B1* | 4/2020 | Johansson | ............ | H04L 65/1069 |
| 10,958,457 B1* | 3/2021 | Davis | ............... | G06Q 10/1095 |
| 11,157,879 B2* | 10/2021 | Smith | ............... | G06Q 10/1095 |
| 2002/0138569 A1* | 9/2002 | Slutsman | ............ | H04L 65/4046 348/E7.083 |
| 2003/0126464 A1* | 7/2003 | McDaniel | ............ | H04L 63/20 726/4 |

(Continued)

*Primary Examiner* — David R Lazaro
*Assistant Examiner* — Julian Chang
(74) *Attorney, Agent, or Firm* — Thomas | Horstemeyer LLP

(57) ABSTRACT

Examples of generating contextual compliance policies are described. A meeting invitation can be created by a meeting organizer. The meeting can have compliance rules associated therewith. A compliance policy that facilitates enforcement of the compliance rules during the meeting can be transmitted to attendee client devices and enforced by a management component running on the client devices.

20 Claims, 5 Drawing Sheets

(56) References Cited

U.S. PATENT DOCUMENTS

| | | | |
|---|---|---|---|
| 2004/0098275 A1* | 5/2004 | Hubert | G06Q 30/0601 705/26.1 |
| 2005/0232423 A1* | 10/2005 | Horvitz | G06Q 10/10 380/255 |
| 2006/0156379 A1* | 7/2006 | Vissapragada | G06F 21/552 726/1 |
| 2007/0016646 A1* | 1/2007 | Tendjoukian | G06Q 10/109 709/206 |
| 2007/0038701 A1* | 2/2007 | Majors | H04L 29/06027 709/204 |
| 2008/0091504 A1* | 4/2008 | Lyle | G06Q 10/109 705/7.19 |
| 2008/0177611 A1* | 7/2008 | Sommers | G06Q 10/1095 705/7.19 |
| 2009/0037594 A1* | 2/2009 | Sever | H04L 63/102 709/230 |
| 2009/0132329 A1* | 5/2009 | Lam | G06Q 10/109 705/7.13 |
| 2010/0088414 A1* | 4/2010 | Lin | H04L 63/102 709/227 |
| 2010/0235216 A1* | 9/2010 | Hehmeyer | G06Q 10/109 705/7.26 |
| 2010/0318399 A1* | 12/2010 | Li | G06Q 10/1093 705/7.18 |
| 2011/0023096 A1* | 1/2011 | Xiao | H04L 63/0236 726/5 |
| 2011/0219425 A1* | 9/2011 | Xiong | G06F 21/00 726/1 |
| 2012/0196571 A1* | 8/2012 | Grkov | H04W 12/126 455/411 |
| 2012/0204235 A1* | 8/2012 | Jaudon | G06F 21/604 726/4 |
| 2013/0007123 A1* | 1/2013 | Crosbie | H04L 63/107 709/204 |
| 2013/0342635 A1* | 12/2013 | Yurchenko | H04L 67/306 348/14.08 |
| 2014/0136630 A1* | 5/2014 | Siegel | G06Q 10/1095 709/206 |
| 2015/0006218 A1* | 1/2015 | Klemm | G06Q 10/1095 705/7.19 |
| 2015/0106629 A1* | 4/2015 | Anderson | H04L 43/00 713/189 |
| 2015/0200786 A1* | 7/2015 | Stott | G06Q 10/1093 709/204 |
| 2015/0319111 A1* | 11/2015 | Carino | H04L 51/04 709/206 |
| 2015/0350251 A1* | 12/2015 | Brander | G06F 16/955 713/168 |
| 2016/0026776 A1* | 1/2016 | Hurst | G06F 21/6209 713/165 |
| 2016/0036875 A1* | 2/2016 | High | H04L 67/16 709/204 |
| 2016/0066189 A1* | 3/2016 | Mahaffey | H04L 63/14 455/405 |
| 2016/0255086 A1* | 9/2016 | Vajravelu | H04L 63/101 726/4 |
| 2017/0054755 A1* | 2/2017 | Mendiratta | H04L 63/1441 |
| 2017/0126755 A1* | 5/2017 | Singh | H04L 65/403 |
| 2017/0236097 A1* | 8/2017 | Smith | G06Q 10/1095 705/7.19 |
| 2017/0249714 A1* | 8/2017 | Van Hoof | G06Q 90/20 |
| 2017/0278070 A1* | 9/2017 | Desai | G06Q 10/1095 |
| 2017/0300868 A1* | 10/2017 | Johnson | G06Q 10/06314 |
| 2017/0300869 A1* | 10/2017 | Johnson | G06Q 10/1093 |
| 2018/0101281 A1* | 4/2018 | Nelson | G06N 5/022 |
| 2018/0101760 A1* | 4/2018 | Nelson | G06Q 10/10 |
| 2018/0101761 A1* | 4/2018 | Nelson | G06Q 10/10 |
| 2018/0101823 A1* | 4/2018 | Nelson | G06Q 10/10 |
| 2018/0101824 A1* | 4/2018 | Nelson | H04L 12/1831 |
| 2018/0109671 A1* | 4/2018 | Xuan | H04W 4/027 |
| 2018/0165656 A1* | 6/2018 | Tessler | G06Q 10/1095 |
| 2018/0183806 A1* | 6/2018 | Nambisan | H04L 41/0893 |
| 2018/0240073 A1* | 8/2018 | Olsher | G06N 5/022 |
| 2018/0351961 A1* | 12/2018 | Calcaterra | G06F 3/048 |
| 2019/0108221 A1* | 4/2019 | Nelson | H04L 12/1831 |
| 2019/0108492 A1* | 4/2019 | Nelson | G06K 9/00288 |
| 2019/0108493 A1* | 4/2019 | Nelson | G10L 15/26 |
| 2019/0108494 A1* | 4/2019 | Nelson | G06Q 10/109 |
| 2019/0108834 A1* | 4/2019 | Nelson | G06Q 10/10 |
| 2019/0220542 A1* | 7/2019 | Estruch Tena | G06F 21/604 |
| 2019/0287073 A1* | 9/2019 | Singh | G06Q 10/00 |
| 2019/0287074 A1* | 9/2019 | Singh | G06Q 10/109 |
| 2020/0057866 A1* | 2/2020 | Levy | H04W 12/63 |
| 2020/0074015 A1* | 3/2020 | De Vansa Vikramaratne | G06F 16/904 |
| 2020/0076819 A1* | 3/2020 | Spurlock | H04L 63/10 |
| 2020/0213319 A1* | 7/2020 | Bowie | H04L 65/403 |
| 2020/0342131 A1* | 10/2020 | Giralt | H04L 65/1089 |
| 2020/0380133 A1* | 12/2020 | Xia | G06F 21/53 |
| 2020/0412732 A1* | 12/2020 | Muthukrishnan | H04L 63/102 |
| 2021/0014676 A1* | 1/2021 | Silverstein | H04W 4/029 |
| 2021/0150489 A1* | 5/2021 | Haramati | G06F 16/287 |
| 2021/0218784 A1* | 7/2021 | Geiselhart | G06Q 10/06314 |

* cited by examiner

GENERATING CONTEXTUAL COMPLIANCE POLICIES

BACKGROUND

Mobile devices are being used for access to enterprise computing systems and resources with greater frequency. With the growing number of different mobile devices, platforms, and operating systems available for adoption by users, various challenges can arise in the management of the mobile devices. As mobile devices become increasing sources for information, they can also become increasing sources for distraction in the workplace during meetings or gatherings of workers in an enterprise setting. Additionally, during certain meetings or events in an enterprise setting sensitive information can be shared with the attendees with little ability to control the flow of information from the attendees' mobile devices.

Mobile device management platforms can be relied upon to facilitate certain challenges associated with the management of large numbers of mobile devices using a console provided by a management service. Access to the capabilities of a mobile device can be managed through the administration of the suite of applications based on a set of management policies, compliance rules, and configuration data which is defined and enforced by the management service.

In many cases, employees and personnel can be ahead of the curve when it comes to the adoption of new mobile devices and related technology. The proliferation of tablet and smartphone devices, for example, has resulted in several companies and organizations allowing employees to bring their own devices to work. The use of these personal devices can be associated with productivity gains and cost savings. The concept "bring your own device" (BYOD) for access to enterprise computing systems may have met initial resistance due to security concerns, but more and more companies are now looking to incorporate BYOD policies.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

As noted above, mobile devices are being used for access to enterprise computing systems and resources with greater frequency in an enterprise environment. As the quantity of applications and services utilized by users in an enterprise environment increases, the potential for distraction as well as information leakage increases. For example, during meetings or other events, notifications, whether audible or not, can create a distraction for users attending the meeting and for the meeting organizer. However, meeting organizers often have little ability to control weather attendees have silenced or suppressed device notifications. As another example, users attending a meeting or event may be exposed to information that is potentially confidential or sensitive. In this instance, an event organizer might wish to remove the ability of users to capture and disseminate information that is shared during the event. An example of such an event could be an all hands corporate meeting or and events during which embargoed or confidential information is provided.

Accordingly, examples of this disclosure provide the ability for a meeting or event organizer to cause a device policy to be sent to a user's device that can either suppress device notifications or remove the ability of a user to access other features of a device, such as a camera, microphone, or other hardware capability. Additionally, examples of the disclosure can escalate a remedial action when noncompliance of a user's device is detected during an event or meeting. The device policy can be provided and enforced by a unified endpoint management (UEM) platform with which user devices are enrolled as managed devices.

Examples of a disclosure can detect when a user is invited to a meeting or events by detecting when the user has received an invitation to an email account associated with the user. Upon detecting an email message that has a meeting type, examples of a disclosure can then detect weather notification or information security policies should also apply to the meeting. If they do, a compliance policy or policies that are enforceable during the meeting can be generated and transmitted to the user's device. The policies can be enforced on the user's device by way of device management APIs that are provided by an operating system framework on the user's device. The policies can also be enforced on the user's device buy a management application that has privileges to administer the user's device on behalf of an enterprise.

Figure 1:
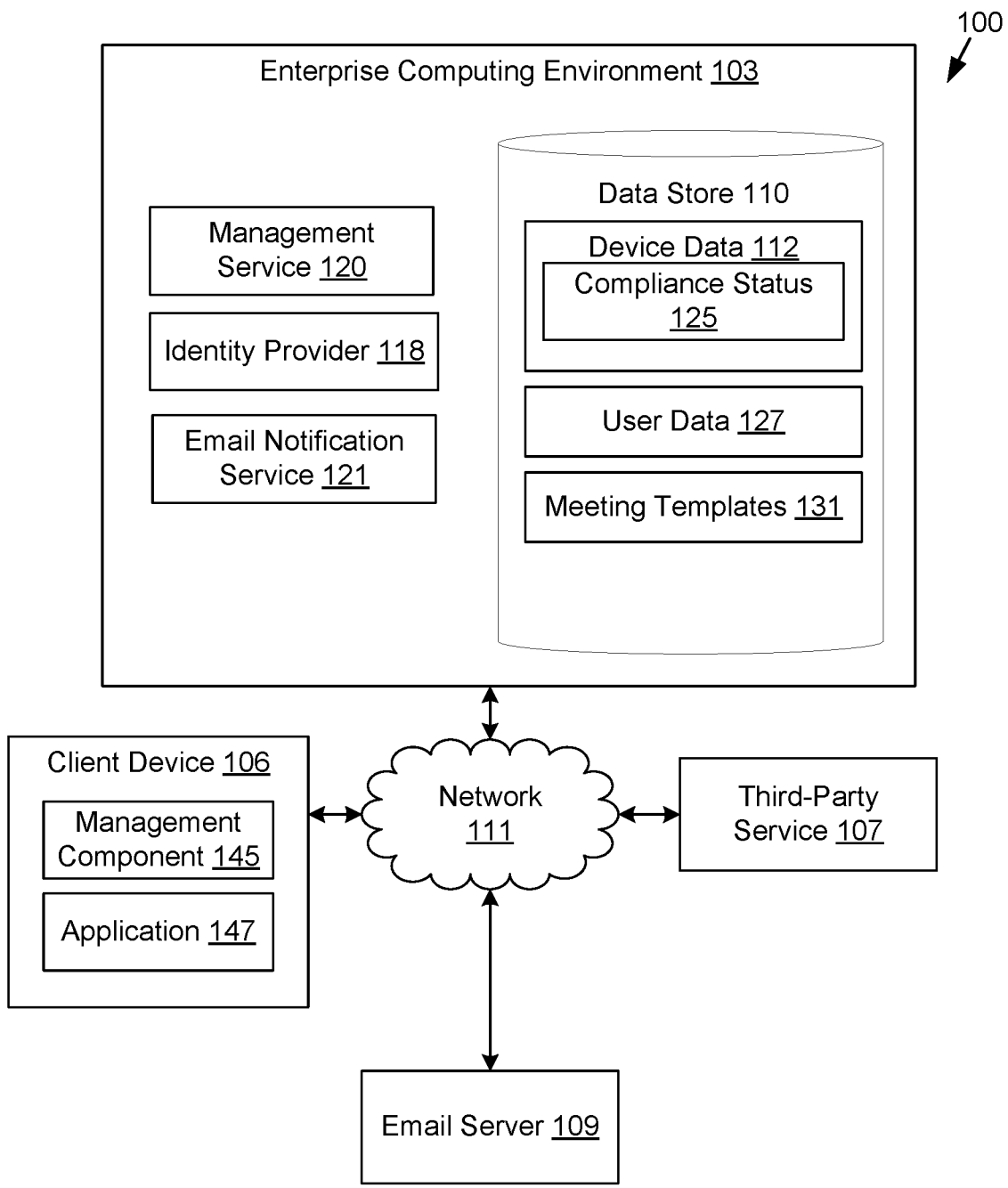
FIG. 1 illustrates an example networked environment for according to various examples described herein.

Turning to the drawings, the following paragraphs provide an outline of a networked environment for generating contextual compliance policies followed by a discussion of the operation of the same. FIG. 1 illustrates an example networked environment 100 for multi-persona enrollment management according to various examples described herein. The networked environment 100 includes an enterprise computing environment 103, email server 109, third party service 107, several client devices 106, and a network 111.

The enterprise computing environment 103 can be embodied as one or more computers, computing devices, or computing systems. In certain embodiments, the enterprise computing environment 103 can include one or more computing devices arranged, for example, in one or more server or computer banks. The computing device or devices can be located at a single installation site or distributed among different geographical locations. The enterprise computing environment 103 can include a plurality of computing devices that together embody a hosted computing resource, a grid computing resource, or other distributed computing arrangement. In some cases, the enterprise computing environment 103 can be embodied as an elastic computing resource where an allotted capacity of processing, network, storage, or other computing-related resources varies over time. As further described below, the enterprise computing environment 103 can also be embodied, in part, as certain functional or logical (e.g., computer-readable instruction) elements or modules as described herein.

The enterprise computing environment 103 can operate as an environment for mobile device management or a UEM platform that can manage the client devices 106. In that context, the computing environment 103 includes a data store 110. The enterprise computing environment 103 can also execute a management service 120, an identity provider 118, and an email notification service 121. The data store 110 includes areas in memory for the storage of device data 112, user data 127, and meeting templates 131, among other types of data. The management service 120 can operate as a UEM platform that can manage client devices 106 that are enrolled as managed devices with the management service 120. The management service 120 can be executed separately from the email server 109. In some implementations, the email server 109 can be operated by a different entity and in a different enterprise computing environment 103 from the management service 120.

Device data 112 can represent information about client devices 106 that are enrolled as managed devices with the management service 120. The device data 112 can include a device identifier, certificates associated with the client device 106, a user identifier identifying the user account with which the device is linked, authentication tokens provided by the identity provider 118 to the client device 106, configuration profiles assigned to the client device 106, and other information regarding management of the client device 106 as an enrolled device. The device data 112 can also include a compliance status 125 associated with a managed device. The compliance status 125 can identify which rules or policies the client device 106 or a user account linked to the client device 106 has violated. For example, the client device 106 may have been taken outside of a specified geofence defined for the client device 106. As another example, the client device 106 may have unauthorized applications installed on the device.

In the context of this disclosure, the compliance status 125 can indicate whether the client device 106 is not in compliance with policies or rules specified by a meeting to which a user linked to the client device 106 has accepted on his or her calendar. For example, if the meeting organizer has specified that audible notifications for meeting attendees should be suppressed in order to attend a particular meeting, the compliance status 125 can indicate that the client device 106 of the user is out of compliance if audible notifications are enabled on the client device 106. As another example, a rule associated with a meeting might specify that a camera or microphone of the client device 106 be disabled during the meeting.

User data 127 represents information about users who have user accounts in the enterprise. These users can also have one or more client device 106 that are enrolled as managed devices with the management service 120. User data 127 can include authentication data, information about third party services with which the user is assigned an account, and information about an email server 109 through which the user receives email and calendar services. The user data 127 can also house an API token or authentication token that permits the email notification service 121 or other services to receive or access email and calendar data of the user.

A meeting template 131 represent templates that can define compliance policies or a rule set that can be applied to a meeting created by a user in the enterprise. A meeting template 131 can specify the types of device and user restrictions that are available for a meeting that can be set by the meeting organizer. For example, various meeting templates 131 can be available to a user creating a meeting using the email server 109, and the user can specify which restrictions are applicable to the meeting. In one example, the meeting template can be an email message that is automatically sent to a user creating a meeting in an auto-reply message. The user can reply to the email message with an indication of which restrictions that he or she wishes to be enforced on the meeting.

In one example, the format of the auto-reply message could be as follows:
Enabled Policy:
Camera: ON [ON, OFF]
Microphone: OFF [ON, OFF]
Notifications: OFF [ON, OFF]
Do Not Disturb: ON [ON, OFF]
Content Access: RESTRICTED ACCESS [FULL ACCESS, RESTRICTED ACCESS, NO ACCESS]
ZOOM CONNECTIVITY: ON [ON, OFF]
SMART TV SCREEN SHARING: ON [ON, ON WITH RECORDING, OFF]
ROOM BADGED ACCESS: ON [ON, OFF]
DISABLED APPS: MESSENGER In the above example, the user can reply to the message and type a selection or a response for each of the policies indicating whether they would like to enable or disable a certain policy. The auto-reply message can be generated when the user adds a meeting resource to a meeting such as a meeting room or a meeting object that is configured to generate the auto-reply message and trigger device management for a meeting created by a user. For example, the creator of the meeting or event can invite a compliance meeting object to a created meeting, which can be a resource created within an enterprise directory that triggers an alert to the management service 120 that a meeting with compliance rules is being created. A mailbox associated with the compliance meeting object can generate the automatic reply message to the meeting organizer. The message can contain a unique identifier associated with the meeting. A response with compliance selections can be received in the mailbox, which can be monitored by the management service 120. In response to receiving the message with selected compliance rules, the management service 120 can generate or retrieve a configuration profile that can be sent to attendee client devices 106 that contain the rules for enforcement by the management component 145.

The management service 120 can determine which client device 106 to send a corresponding compliance policy by tracking responses to a meeting invitation sent by a meeting attendee to the meeting organizer. Accordingly, the email notification service 121 can alert the management service 120 whenever a meeting type message is sent or received by users in the enterprise and when a meeting acceptance is sent by a user, the email notification service 121 can alert the management service 120, and the management service 120 can generate a compliance policy that is transmitted to the management component 145.

The management service 120 can enroll several client devices 106 for mobile device management services. To begin enrollment, the management service 120 can identify and authenticate one of the client devices 106 and store data related to the client device 106 in the device data 112 for later reference. In some cases, the management service 120 (or a management agent or application executing on the client device 106) can also be registered as a device administrator (at least in part) of the client device 106, permitting the management service 120 to configure and manage certain operating aspects of the client device 106.

A meeting template 131 can also be linked to an email classification template or message classification that can be selected using an email client with a meeting invitation is created by a user. The user can select an email classification template that contains metadata identifying the compliance rules the organizer wishes to enforce when sending the meeting invitation to meeting attendees. An email classification template can be stored in the email server 109 and selectable by users using an email client when composing a meeting invitation corresponding to a meeting or event. An email classification template can be a feature of the email server 109 that allows a user on an email client to select a template that is applied to an email message or meeting invitation that the user is composing. In examples of this disclosure, an email classification template can be defined that includes one or more restrictions or rules for enforcement on a meeting that is created by a user.

Once the client device 106 is enrolled for device management by the management service 120, the management service 120 can direct the installation of various software components or applications on the client device 106. The software components can be configured on the client device 106 at the direction of the management service 120. Such software components can include, for example, applications, resources, libraries, and other related components.

The management service 120 can also transmit management policies, compliance rules, and configuration data for execution by and/or enforcement on the client device 106. In that context, during or after enrollment, the management service 120 can retrieve or generate a set of management policies, compliance rules, and configuration data for the client device 106 and transfer those policies, rules, and data to the client device 106 for reference by the operating system and certain applications executing on the client device 106.

The management service 120 can also provide a management console as an engine and console interface for device management of the client devices 106. An information technology administrator or user, for example, can view, administer, and update the management policies, compliance rules, and configuration data on the client devices 106 using the management console. The policies, rules, and configuration data can be collectively administered for several of the client devices 106 by organizing the client devices 106 into several different groups or categories of devices according to organizational or other factors or considerations.

The identity provider 118 can provide single sign-on or identity management capabilities for an enterprise. The identity provider 118 can allow users to authenticate his or her identity to obtain an authentication token that can be provided to a third party service. The identity provider 118 can utilize OAuth, security assertion mark-up language (SAML), or other single sign-on methodologies. The identity provider 118 and management service 120 can communicate so that the management service 120 can revoke or authorize access to various services for users in the enterprise based on status of a client device 106 assigned to the user. The identity provider 118 can also rely on user data 127 in the data store 110. In some examples, the identity provider 118 can rely upon a separate source of user data in a separate data store.

The third party service 107 can be embodied as one or more computers, computing devices, or computing systems. Like the enterprise computing environment 103, the third party service 107 can include one or more computing devices arranged, for example, in one or more server or computer banks. The computing device or devices can be located at a single installation site or distributed among different geographical locations. The third party service 107 can include a plurality of computing devices that together embody a hosted computing resource, a grid computing resource, or other distributed computing arrangement. The third party service 107 can also be embodied, in part, as certain functional or logical (e.g., computer-readable instruction) elements or modules as described herein.

The third party service 107 can be a third party service provided by an enterprise to its users. The third party service 107 can federates its authentication for users of the enterprise to the identity provider 118. The third party service 107 can be a cloud-based conferencing service, sales tool, or other system for which the identity provider 118 can authenticate access by users of the enterprise. Additionally, the third party service 107 can be a physical access control system that determines whether a user-presented credential, such as a badge or mobile device, should be granted access to a physical space or area. The physical access control system can unlock a door in response to a user presented a valid credential. In the case of a physical access control system and certain other services, the system can be hosted on premises within the enterprise computing environment 103 rather than offsite in a third party service 107.

The email server 109 represents one or more email servers that provide email service to the enterprise and its users. The email server 109 can be hosted by a third party or on premises of the enterprise. The email server 109 can also provide a user's contacts, calendar, notes, and other data. These various services can be integrated such that a user's email and calendar go together. For example, users can add items to their calendar, create meeting events, respond to invitations, and otherwise manage their schedule in a manner that is integrated with email.

For example, a user might create a meeting in a calendar managed by the email server 109, and the user can invite other users to attend the meeting. The invitations can be sent by email as an email message having a meeting type. The email message can include metadata, attachments, or other data constructs so that an email client and/or an email server 109 can identify parameters associated with the meeting or event, such as a location, start time, end time, date, and invitee data. Responses to an invitation can also be sent by email with metadata or attachments that allow the email message to be identified as a meeting type or response type. The response message can also contain an indication of whether a user accepts, declines, or responds tentatively to a meeting request.

The email notification service 121 represents an engine or server that can be associated with an email client running on a client device 106. The email notification service 121 can be implemented within the enterprise computing environment 103 or in another computing environment. The email notification service 121 generate notifications corresponding to email messages, meeting invitations, and other data for which notifications are generated by the email client on the client device 106. In some operating system ecosystems, such as mobile operating systems, an ecosystem developer might require that incoming notifications to a client device 106 to be sent through a notification service that is managed by the mobile operating system provider. For example, Apple iOS®, in some instances, require notifications to be sent to a user's device using a notification API like Apple Push Notification Service (APNS). APNS is a service that is operated by Apple and not the application developer. Analogously, Android devices can be configured to receive device notifications through an operating system provider API.

Accordingly, because the email server 109 can be operated by an entity that is different from the operating system of the client device 106, the email notification service 121 is a service that is separate from the email server 109 and separate from the operating system of the client device 106. The email notification service 121 can be instrumented to receive information about email messages received by the email server 109 on behalf of a user. Then, the email notification service 121 can provide data to an email client on the client device 106 so that device notifications can be generated. For example, if the email client is set up to display or sound a notification whenever an email message is received, the email notification service 121 can detect an incoming message to the email server 107 and transmit information about the email message to the email client so that the email client can generate the notification with information about the email message on the device.

The email notification service 121 can be implemented along with an email client that is installed on the client device 106. The email notification service 121 can be implemented as a feature of an email client installed on the client device 106 or as a service that runs remotely from the client device 106. The email notification service 121 can be provided an authentication token associated with a user account in the email server 109 so that access to the email account of the user can be gained.

In examples of this disclosure, the email notification service 121 can also detect an email message associated with a meeting or event on the user's calendar and notify the management service 120. The management service 120, in response, can generate a configuration policy transmitted to the client device 106 that operates to suppress a feature of the client device 106 as specified in the policy. The policy can be in force for the duration of the meeting or event. This functionality will be described in further detail herein.

The email notification service 121 can identify a user account of the user in the management service 113 or enterprise directory using a user identifier associated with the user in the email server 109. The user identifier can be a username or email address of the user that is linked to the user in the email server 109.

The client devices 106 are representative of one or more client devices. Each client device 106 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client devices 106 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client devices 106.

As illustrated in FIG. 1, an example client device 106 can be enrolled by the management service 120 for device management. A management component 145 can be installed on a client device 106 locally manage the device on behalf of the remotely executed management service 120. The management component 145 can be installed with elevated privileges or be effectuated through operating system APIs to manage the client device 106 on behalf of the management service 120. The management component 145 can have the authority to manage data on the client device 106, install, remove, or disable certain applications, or install configuration profiles, such as VPN certificates, Wi-Fi profiles, email profiles, etc.

The management component 145 can also have the authority to enable or disable certain hardware features of the client device 106 in certain instances. For example, the management component 145 can communicate with the operating system of the client device 106 to disable a camera, microphone, or other data capture sensor or capability of the client device 106. The management component 145 can also place the device into different hardware modes, such as airplane mode, silent mode, do-not-disturb mode, or other modes supported by the client device 106.

The management component 145 can alter operation of the client device 106 in response to commands or policies provided by the management service 120 to the client device 106. The management component 145, in one instance, can poll the management service 120, or a command queue associated with the management service 120, to determine whether a management command intended for the client device 106 has been sent to the client device 106. In response to the command queue having a command for a client device 106, the management component 145 can retrieve the command and execute the command on the client device 106. The command might instruct the management component 145 to install a configuration profile, enforce a restriction or policy, or take other management actions on the client device 106. In one example, the management service 120 might detect that the client device 106 is out of compliance with respect to a compliance rule and might instruct the management component 145 to restrict a hardware feature of the client device 106, delete data from the client device 106, or disable certain applications on the client device 106. The management component 145 can also take other variations of management actions on the client device 106 as directed by the management service 120.

An application 147 can be any software executed on the client device 106. An application 147 can be an email client, a file synchronization tool, a document editor, data entry tool, or other application that can be deployed by the enterprise to a user's client device 106. The management component 145 can install, disable, or remove certain applications as directed by the management service 120. The management component 145 can also install policies, data, or profiles that can be accessed by an application 147 on the client device 106.

As part of the enrollment process, the management service 120 and/or management component 145 can be registered as a device administrator of the client device 106, permitting the management service 120 and/or management component 145 to manage certain operating aspects of the client device 106. In either case, the management service 120 can remotely configure the client device 106 by interacting with the management component 145. The management service 120 can also transfer various software components to the client device 106, and those software components can be installed and/or configured on the client device 106 at the direction of the management component 145. Such software components can include, for example, applications, resources, libraries, drivers, device configurations, or other related components. The management service 120 can also transfer various management policies, compliance rules, and configuration data for enforcement on the client device 106, and those policies, rules, and data can be stored on the client device 106 by the management component 145 The management service 120 can then instruct the management component 145 and the operating system of the client device 106 to enforce the management policies, compliance rules, and configuration data stored on the client device 106.

The network 111 can include the Internet, intranets, extranets, wide area networks (WANs), local area networks (LANs), wired networks, wireless networks, cable networks, satellite networks, other suitable networks, or any combinations thereof. As one example, the computing environment 103 and the client devices 106 can be respectively coupled to one or more public or private LANs or WANs and, in turn, to the Internet for communication of data among each other. Although not shown in FIG. 1, the network 111 can also include communicative connections to any number and type of network hosts or devices, such as website servers, file servers, cloud computing resources, databases, data stores, or any other network or computing architectures.

In the networked environment 100, the enterprise computing environment 103, the email server 109, the third party service 107, and the client devices 106 can communicate data among each other over the network 111 using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

Figure 2:
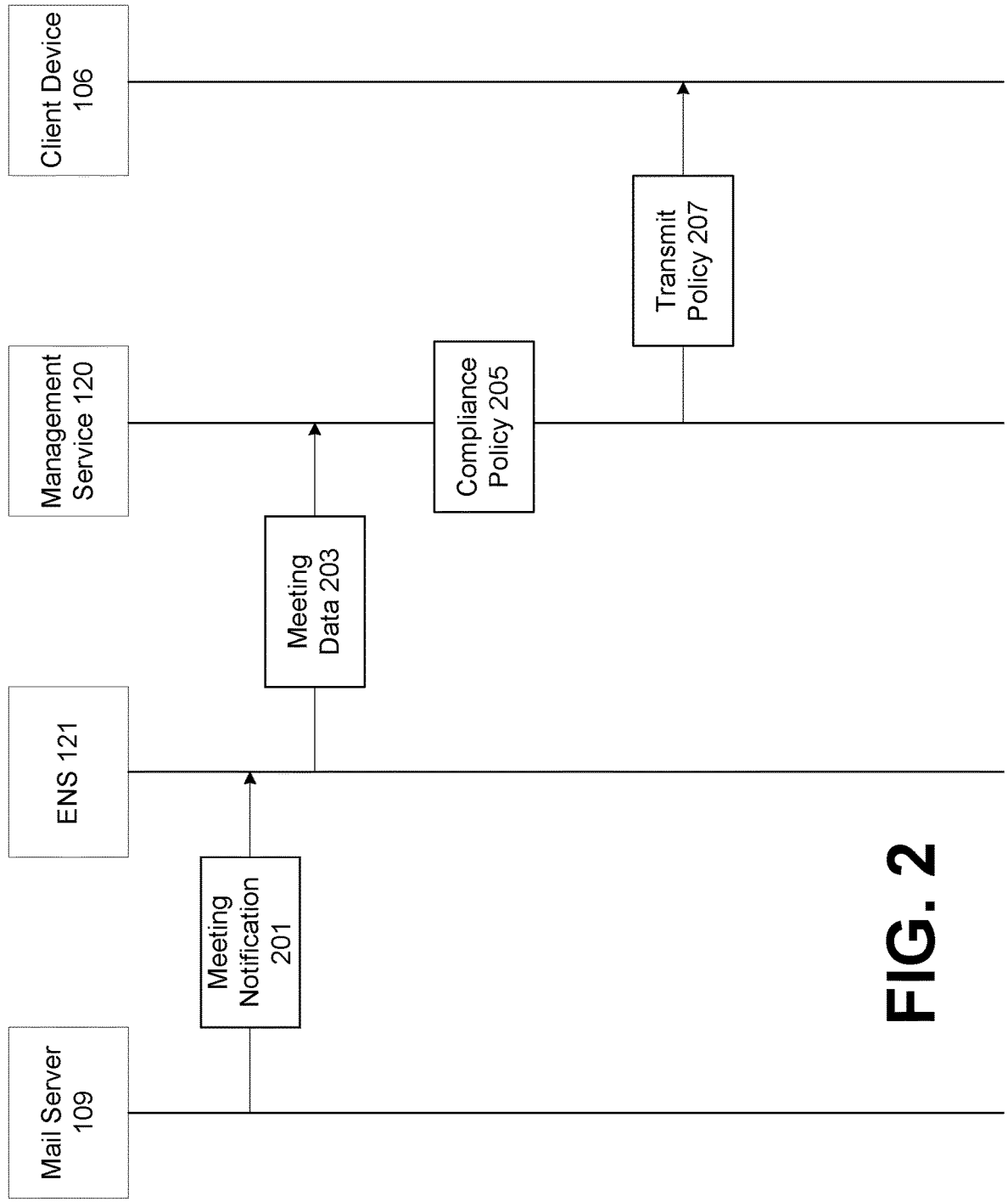
FIG. 2 illustrates a flowchart according to various examples described herein.

Moving now to FIG. 2, shown is an example sequence diagram illustrating interactions between the systems show in FIG. 1. The sequence diagram illustrates how a management service 120 and email notification service 121 can facilitate contextual compliance policies for meetings or events.

First, at step 201, the email server 109 can provide an indication of an email message of a message type to the email notification service 121. In one example, the email notification service 121 can monitor the email server 109 on behalf of a user with an email client associated with the email notification service 121 installed on his or her client device 106. When an email message is received by the email server 109, the email notification service 121 can be configured to detect the email and provide a notification to an email client running on the client device 106. The email notification service 121 can also be configured to provide the email message, or metadata regarding the email message, to the management service 120. In some instances, the email notification service 121 can only provide data about the email message if it is related to a meeting, or the message has a meeting type.

The meeting notification be an invitation sent to another user. When the email notification service 121 or management service 120 detects that a meeting for which compliance enforcement is desired. The meeting notification can be an acceptance of a meeting invitation sent by a first user to a second user who invited the first user to the event. The management service 120 can receive an indication of meeting notifications that are sent by or received by users with a user account in the email server 109.

At step 203, meeting data about the email message, if an email message received by the email server 109 has a meeting type, the meeting data can be provided to the management service 120 from the email notification service 121. In the case of a meeting invitation that is being sent to users, the meeting data can include a meeting organizer, information about attendees invited to the meeting, and a location of the meeting. The meeting data can also identify one or more compliance policies that the meeting organizer selects for enforcement on the meeting.

The meeting data can identify compliance policies as a result of the meeting organizer selecting a meeting template that specifies the compliance policies for enforcement on attendees. The meeting data can also be identified based upon a reply to an auto-reply message in which the user specifies or selects compliance policies for enforcement during the meeting.

At step 205, the management service 120 can generate or retrieve a compliance policy that identifies the restrictions that the management component 145 can enforce on a client device 106 identified as being associated with a meeting attendee. The compliance policy can specify a starting time and a duration or ending time of a meeting. The compliance policy, for example, can specify that the client device 106 on which the compliance policy is installed should suppress audible notifications, disable hardware features of the client device 106, such as the camera or microphone, disable certain applications installed on the client device 106, or perform other restrictive actions during the meeting time specified by the meeting data.

At step 207, the management service 120 can transmit the compliance policy to the client device 106, which can be received by the management component 145 and enforced during the meeting by the management component 145 because the management component 145 can act as a management agent on the client device 106 on behalf of the management service 120.

Figure 3:
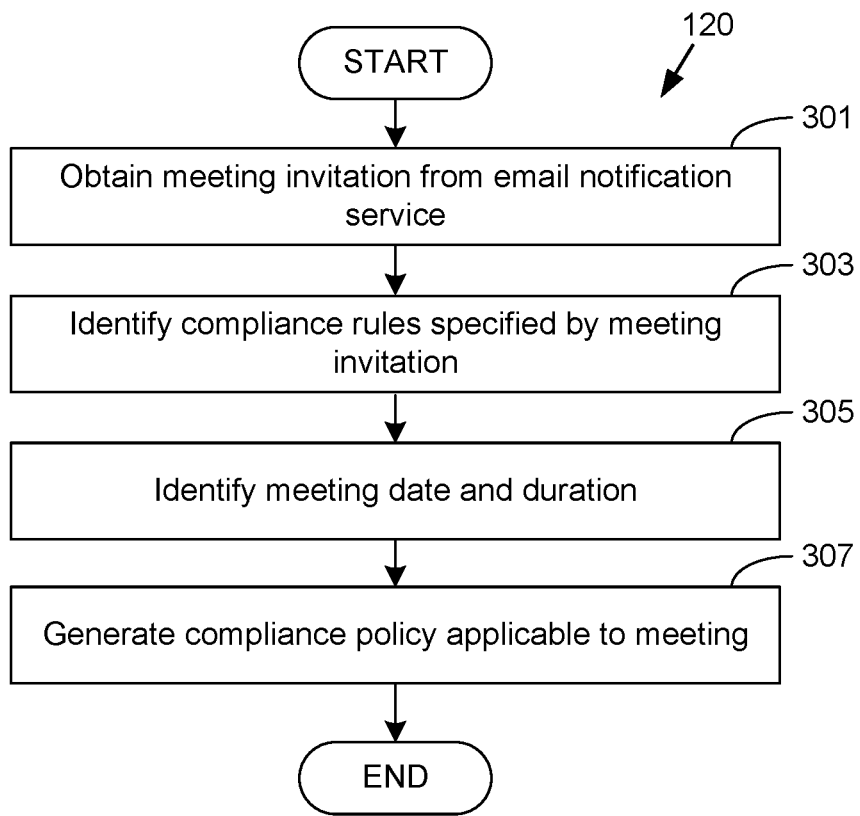
FIG. 3 illustrates a flowchart according to various examples described herein.

Referring next to FIG. 3, shown is a flowchart that illustrates how the management service 120 can identify a meeting or event for which compliance rules are applicable and generate a corresponding compliance policy. First, at step 301, the management service 120 can obtain a meeting invitation for a meeting or event. The meeting invitation can be generated by an email client and sent to one or more users with email accounts in the email server 109. The email notification service 121 can detect when recipients of the meeting invitation receive the message because the email notification service 121 is configured to receive information about emails received in a mailbox to facilitate notifications on the client device 106, as noted above.

In some instances, the management service 120 can obtain the meeting invitation from the email notification service 121 by detecting that a compliance meeting object has been invited to a meeting or event by the creator of the meeting. The management service 120 can monitor the mailbox associated with the compliance meeting object. The creator of the meeting can invite a compliance meeting object that exists in the user directory by adding an email address or nickname associated with the compliance meeting object to a meeting invitation. The management service 120 can monitor the mailbox associated with the compliance meeting object. When the meeting invitation is sent to a corresponding mailbox associated with the compliance meeting object, the management service 120 can identify the creator of the meeting or event and facilitate creation of one or more compliance policies based upon the selections of the meeting creator.

In other instances, the management service 120 can obtain the meeting invitation by receiving all meeting invitations or meeting notifications from the email notification service 121 and determine whether a particular meeting requires enforcement of compliance rules based on whether the user has selected a particular email classification template that defines compliance rules or by detecting certain keywords or identifiers in the meeting invitation that specify compliance rules.

At step 303, the management service 120 can identify compliance rules specified by the meeting invitation. In some examples, the management service 120 can cause an auto-reply message to be sent to the meeting creator that allows the user to select the compliance rules that are enforced during the meeting. The meeting creator can send a reply to the message with the selections. The management service 120 can monitor the mailbox of the compliance meeting object for the reply, which can contain a unique identifier that the management service 120 can generate for the meeting along with the user selections of the compliance rules. In some examples, the auto-reply message can include a link to a page accessible using a browser in which the user can select the available compliance rules for enforcement during the meeting. The page can be generated by or on behalf of the management service 120.

In some examples, the management service 120 can identify the compliance rules specified by the meeting invitation by identifying an email classification template that the user has selected to be associated with the meeting invitation. In some implementations, the user can select from various email classification templates to be associated with the meeting invitation. The email classification templates can be defined within the email server 109 and can be selected by an email client used to create the meeting invitation. The email classification template can have metadata that contain pre-selected compliance rules that can be applied to the meeting without requiring the meeting organizer to individually select compliance rules for the meeting.

In some examples, the management service 120 can utilize a machine learning process that receives user selections of compliance rules for enforcement during a meeting and generates a default list of compliance rules for a user based on a history of prior selections.

Once the compliance rules for the meeting are selected or identified by the management service 120, at step 305, the management service 120 can identify the meeting date and duration. The meeting date or duration can be identified from the meeting invitation sent by the meeting organizer.

At step 307, the management service 120 can generate a compliance policy that identifies the compliance rules in effect for the meeting at the meeting time and duration. The compliance policy can be enforced on a client device 106 by the management component 145 on behalf of the management service 120 for devices that are enrolled as managed devices with the management service 120.

Figure 4:
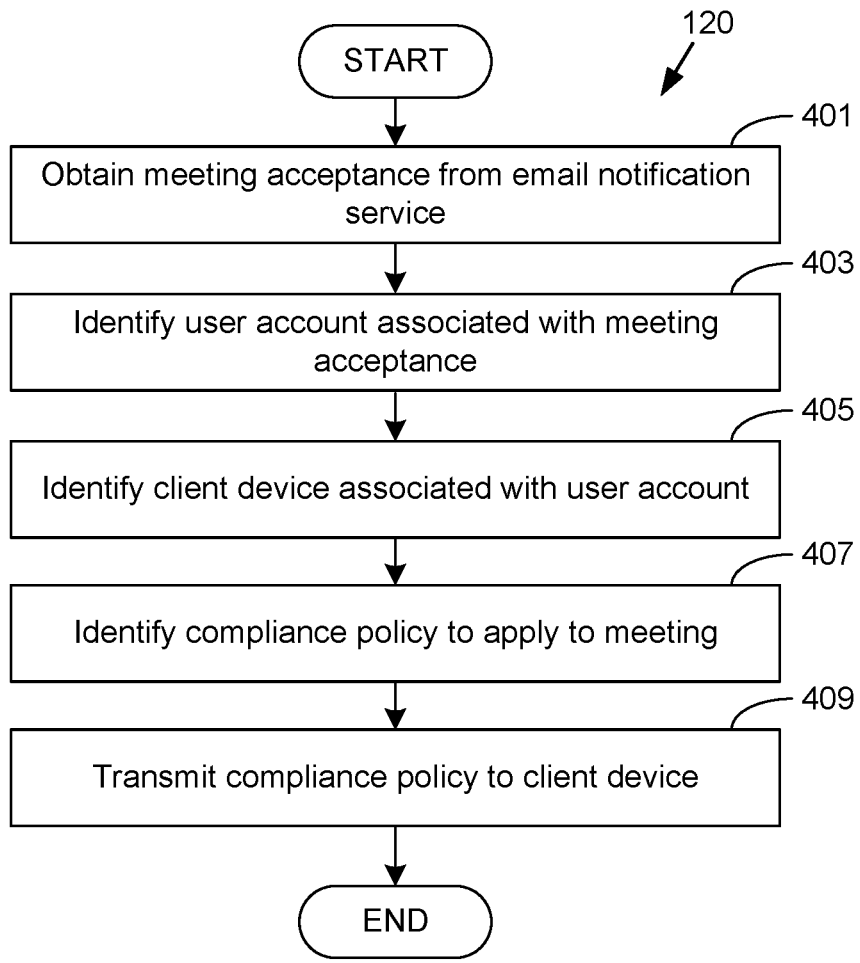
FIG. 4 illustrates a flowchart according to various examples described herein.

Referring next to FIG. 4, shown is a flowchart that illustrates how the management service 120 can identify a meeting or event for which compliance rules are applicable and generate a corresponding compliance policy. First, at step 401, the management service 120 can obtain a meeting acceptance corresponding to a user acceptance of a meeting invitation. The meeting acceptance can be an email message with a meeting type that indicates acceptance of a meeting invitation.

The meeting acceptance can be generated by an email client and sent to a meeting organizer with an email account in the email server 109. The meeting acceptance can identify the meeting to which the recipient is responding so that the email server 109 can track attendance of the meeting. Accordingly, the email notification service 121 can detect when a meeting acceptance is sent because the email notification service 121 is configured to receive information about emails received in a mailbox to facilitate notifications on the client device 106, as noted above. The email notification service 121 can provide the meeting acceptance to the management service 120. In some examples, the email notification service 121 can provide the meeting acceptance to the management service 120 only for meetings where compliance enforcement is required or requested. The email notification service 121 can detect these meetings by determining whether the compliance meeting object was included on the meeting or whether the meeting has compliance enforcement enabled by another mechanism selected by the user, such as via an email classification template selected for the meeting invitation corresponding to the meeting.

At step 403, the management service 120 can identify a user associated with the meeting. The management service 120 can identify the user by identifying a sender of the meeting acceptance. The sender of the acceptance can then be mapped to a user account in the management service 120 so that a client device 106 associated with the user can then be identified.

At step 405, the management service 120 can identify a client device 106 associated with a user account of the sender of the meeting acceptance. The client device 106 can be one that is enrolled as a managed device with the management service 120 so where a management component 145 can locally enforce compliance policies on behalf of the management service 120.

At step 407, the management service 120 can identify a compliance policy associated with the meeting. The management service 120 can identify the compliance policy generated or retrieved in the process shown in FIG. 3 because the meeting acceptance can reference the meeting or event with which the acceptance corresponds.

At step 409, the management service 120 can transmit a compliance policy to be enforced during the meeting to the client device 106. The management component 145 can enforce the compliance rules set forth in the compliance policy because it can be installed or designated as a device administrator. Accordingly, the management component 145 can enforce the compliance rules for the duration of the meeting or event on behalf of the management service 120. Thereafter, the process proceeds to completion.

Figure 5:
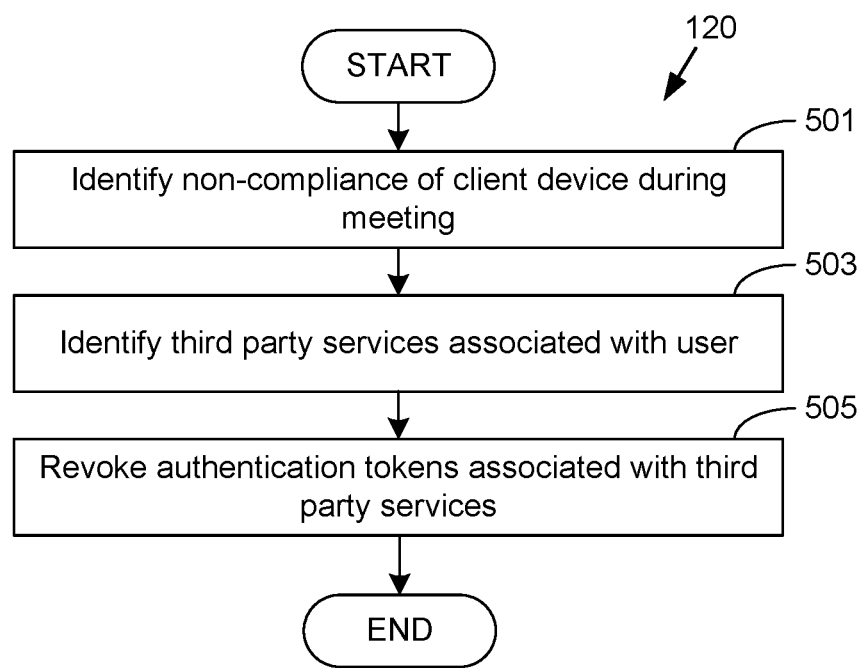
FIG. 5 illustrates a flowchart according to various examples described herein.

Referring next to FIG. 5, shown is a flowchart that illustrates a process for how the management service 120 can handle non-compliance of a client device 106 for which a compliance policy is in effect during a meeting or event. First, at step 501, the management service 120 can identify non-compliance of a client device 106 during a meeting or event for which compliance enforcement is enabled.

The management service 120 can detect non-compliance by receiving a notification from a management component 145 that is installed on the client device 106. In some instances, certain compliance policies transmitted to the client device 106 can be overridden by a user or ignored by a user if there lacks a mechanism for the management component 145 to programmatically enforce one of the compliance rules, such as a geofence or location-based compliance rule.

At step 503, if non-compliance has been detected, the management service 120 can identify one or more third party service 107 associated with the user account linked to the client device 106. The third party service 107 can be the email server 109, a physical access system that controls access to doors and other locked resources using a proximity reader, cloud-based tool with which the user has an account, a Wi-Fi network to which the client device 106 is connected, or other resources that the user is authenticated to access. The one or more third party service 107 can be services that federate authentication to the identity provider 118, which can grant or revoke authentication tokens as directed by the management service 120.

At step 505, the management service 120 can revoke one or more authentication tokens provided to the client device 106 to access the identified third party service 107. The authentication token can disable access to certain services until the client device 106 is brought back into compliance during the meeting. In some implementations, the remedial actions or the services to which access is revoked can be defined in the compliance policy generated by the management service 120 to apply to the meeting. For example, upon detecting non-compliance of a client device 106 during a meeting, the management service 120 can revoke a credential assigned to the client device 106 or user in physical access control system and grants or denies access to a meeting room or other physical resource. Revocation of the credential would mean that the user is denied access to the physical resource. Similarly, the user can be denied access to a Wi-Fi network or a cloud-based service for which authentication is federated to the identity provider 118. Thereafter, the process proceeds to completion.

The flowcharts in FIGS. 2-5 show examples of the functions and operation of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or several interconnected circuits that implement the specified logical function(s).

The enterprise computing environment 103 and can include at least one processing circuit. Such a processing circuit can include, for example, one or more processors and one or more storage or memory that are coupled to a local interface. The local interface can include, for example, a data bus with an accompanying address/control bus or any other suitable bus structure. Similarly, the client devices 106 can each include at least one processing circuit. Such a processing circuit can include, for example, one or more processors and one or more storage or memory devices that are coupled to a local interface.

The storage or memory devices can store data or components that are executable by the processors of the processing circuit. For example, the management service 120 and/or other components can be stored in one or more storage devices and be executable by one or more processors in the environment 100. Similarly, the agents, services, applications and/or other components described herein can be stored in one or more storage devices and be executable by one or more processors in the client device 106.

The management service 120 and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the management service 120 and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method for generating contextual compliance policies, comprising:
obtaining, by a management service, meeting notification data from an email notification service configured to provide an email notification to a client device, the meeting notification data associated with a meeting notification from an email server associated with an email account, the meeting notification generated in response to an email message from a meeting initiator having a meeting message type;
obtaining, by the management service, a reply to an auto-reply message generated in response to the email message from the meeting initiator, the auto-reply message generated in response to a message being sent to a meeting object configured to generate the auto-reply message, wherein the reply to the auto-reply message specifies at least one compliance policy that alters a device functionality of a client device, wherein the management service is implemented separately from the email notification service and the email server;

obtaining, in response to the meeting notification, the at least one compliance policy that alters a device functionality of a client device associated with the email account; and transmitting, by the management service, the at least one compliance policy to the client device, wherein a management component on the client device installs the compliance policy, the compliance policy being enforced during a meeting associated with the meeting notification.

2. The method according to claim 1, further comprising:
obtaining a rule set associated with the meeting from a message classification associated with the email message, wherein the rule set is embedded within the message classification; and
generating the compliance policy based upon the rule set.

3. The method according to claim 2, wherein the rule set is specified by a meeting organizer in a response to creation of a meeting object in the email server that corresponds to the meeting, wherein the meeting object specifies at least one of a date, a start time, and an end time associated with the meeting object.

4. The method according to claim 2, wherein the rule set is automatically generated based upon an identity of a meeting organizer or an identity of a user linked to the email account.

5. The method according to claim 1, further comprising causing, by the management service, an authentication token corresponding to a federated service to be revoked during the meeting, the authentication token associated with a user account linked to the email account, wherein the authentication token is revoked in response to detecting non-compliance with the compliance policy during the meeting.

6. The method according to claim 5, wherein the authentication token is associated with a physical access credential for a meeting room, wherein revoking the authentication token causes the physical access credential to be denied access to the meeting room.

7. The method according to claim 1, further comprising:
obtaining a rule set associated with the meeting from user interface generated in response to a link provided to a meeting organizer; and
generating the compliance policy based upon the rule set.

8. A non-transitory computer-readable medium embodying program code executable by at least one computing device, the program code, when executed, causing the at least one computing device to at least:
obtain, in a management service, meeting notification data from an email notification service configured to provide an email notification to a client device, the meeting notification data associated with a meeting notification from an email server associated with an email account, the meeting notification generated in response to an email message from a meeting initiator having a meeting message type;

obtain, in the management service, a reply to an auto-reply message generated in response to the email message from the meeting initiator, the auto-reply message generated in response to a message being sent to a meeting object configured to generate the auto-reply message, wherein the reply to the auto-reply message specifies at least one compliance policy that alters a device functionality of a client device, wherein the management service is implemented separately from the email notification service and the email server;

identify, based upon the meeting notification data, a compliance policy that alters a device functionality of a client device associated with the email account, the compliance policy identified in the meeting notification data associated with the email notification;

obtain, in response to the meeting notification, the compliance policy that alters a device functionality of a client device associated with the email account; and transmit the compliance policy to the client device, wherein a management component on the client device installs the compliance policy, the compliance policy being enforced during a meeting associated with the meeting notification.

9. The non-transitory computer-readable medium according to claim 8, wherein the at least one computing device is further directed to at least:
obtain a rule set associated with the meeting from a message classification associated with the email message, wherein the rule set is embedded within the message classification; and
generate the compliance policy based upon the rule set.

10. The non-transitory computer-readable medium according to claim 9, wherein the rule set is specified by a meeting organizer in a response to creation of a meeting object in the email server that corresponds to the meeting, wherein the meeting object specifies at least one of a date, a start time, and an end time associated with the meeting object.

11. The non-transitory computer-readable medium according to claim 9, wherein the rule set is automatically generated based upon an identity of a meeting organizer or an identity of a user linked to the email account.

12. The non-transitory computer-readable medium according to claim 8, wherein the program code further causes the at least one computing device to at least:
cause an authentication token corresponding to a federated service to be revoked during the meeting, the authentication token associated with a user account linked to the email account, wherein the authentication token is revoked in response to detecting non-compliance with the compliance policy during the meeting.

13. The non-transitory computer-readable medium according to claim 12, wherein the authentication token is associated with a physical access credential for a meeting room, wherein revoking the authentication token causes the physical access credential to be denied access to the meeting room.

14. The non-transitory computer-readable medium according to claim 8, wherein the program code causes the at least one computing device to at least:
obtain a rule set associated with the meeting from user interface generated in response to a link provided to a meeting organizer; and
generate the compliance policy based upon the rule set.

15. A system for multi-persona enrollment management, comprising:
at least one computing device; and
at least one application executed by the at least one computing device, the at least one computing device causing the at least one computing device to at least:
obtain, in a management service, meeting notification data from an email notification service configured to provide an email notification to a client device, the meeting notification data associated with a meeting notification from an email server associated with an email account, the meeting notification generated in response to an email message from a meeting initiator having a meeting message type;

obtain, in the management service, a reply to an auto-reply message generated in response to the email message from the meeting initiator, the auto-reply message generated in response to a message being sent to a meeting object configured to generate the auto-reply message, wherein the reply to the auto-reply message specifies at least one compliance policy that alters a device functionality of a client device, wherein the management service is implemented separately from the email notification service and the email server;

identify, based upon the meeting notification data, a compliance policy that alters a device functionality of a client device associated with the email account, the compliance policy identified in the meeting notification data associated with the email notification;

obtain, in response to the meeting notification, the compliance policy that alters a device functionality of a client device associated with the email account; and transmit the compliance policy to the client device, wherein a management component on the client device installs the compliance policy, the compliance policy being enforced during a meeting associated with the meeting notification.

16. The system according to claim 15, wherein the at least one computing device is further configured to at least:

obtain a rule set associated with the meeting from a message classification associated with the email message, wherein the rule set is embedded within the message classification; and generate the compliance policy based upon the rule set.

17. The system according to claim 16, wherein the rule set is specified by a meeting organizer in a response to creation of a meeting object in the email server that corresponds to the meeting, wherein the meeting object specifies at least one of a date, a start time, and an end time associated with the meeting object.

18. The system according to claim 16, wherein the rule set is automatically generated based upon an identity of a meeting organizer or an identity of a user linked to the email account.

19. The system according to claim 15, wherein the at least one application causes the at least one computing device to at least:

cause an authentication token corresponding to a federated service to be revoked during the meeting, the authentication token associated with a user account linked to the email account, wherein the authentication token is revoked in response to detecting non-compliance with the compliance policy during the meeting.

20. The system according to claim 19, wherein the authentication token is associated with a physical access credential for a meeting room, wherein revoking the authentication token causes the physical access credential to be denied access to the meeting room.

* * * * *